UNITED STATES PATENT OFFICE.

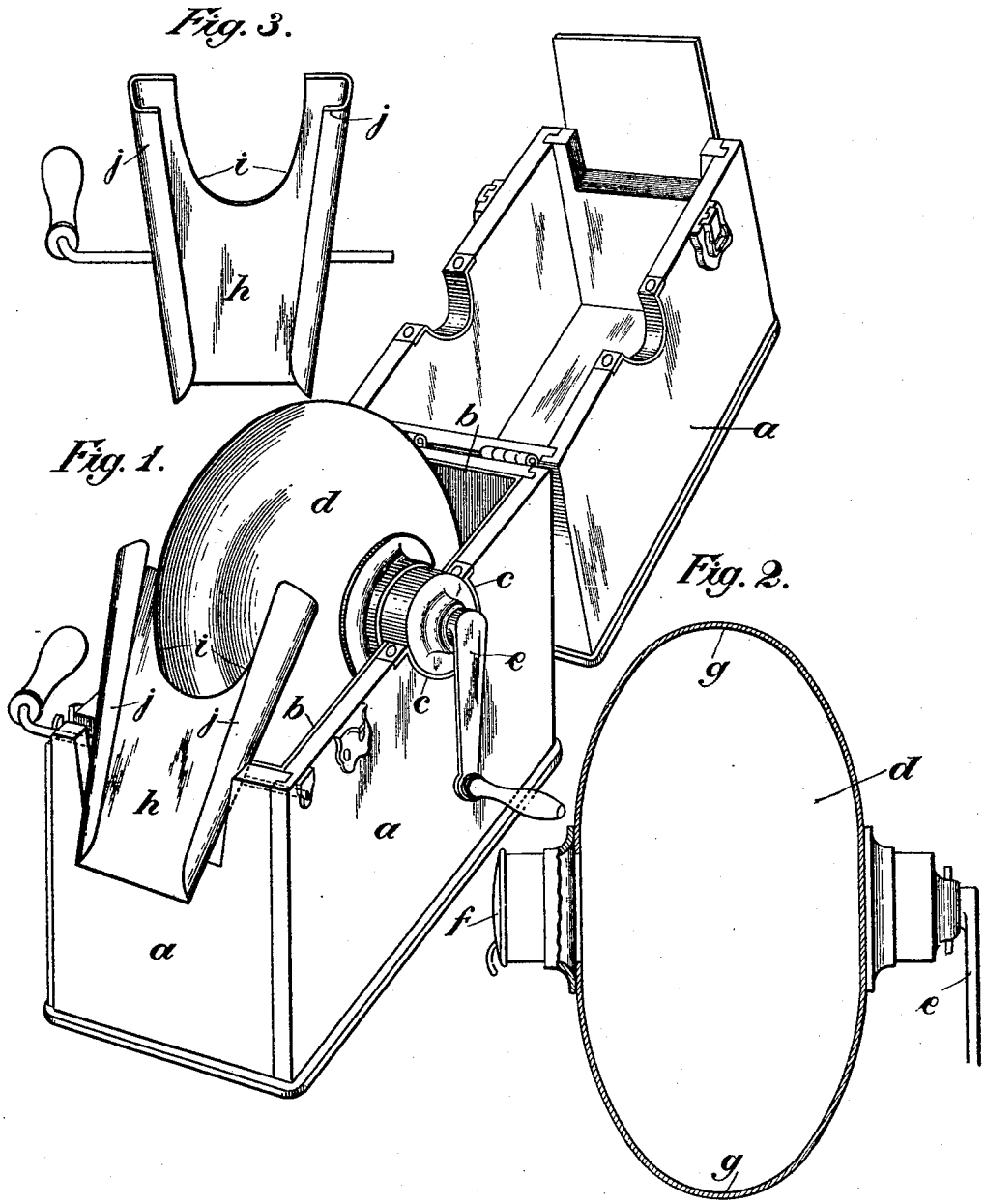

JOHN McAULIFFE LONG, OF MANCHESTER, ENGLAND.

FREEZING APPARATUS.

1,119,707. Specification of Letters Patent. Patented Dec. 1, 1914.

Application filed September 27, 1913. Serial No. 792,187.

*To all whom it may concern:*

Be it known that I, JOHN MCAULIFFE LONG, subject of the King of Great Britain, residing at Manchester, England, have invented certain new and useful Improvements in Freezing Apparatus, of which the following is a specification.

One type of apparatus for making ice cream and analogous material now in use comprises a rotating drum which contains the freezing or cooling material and moves through a pan or dish containing the material to be frozen or cooled. The material becomes frozen and adheres to the periphery of the drum and is removed therefrom by means of a suitable scraper operating upon the periphery of the drum. With such devices the material also becomes frozen on the sides of the drum where it is not convenient for removal into the collecting dishes and special scraping appliances have been tried with the object of collecting this material but so far without satisfactory result.

It is desirable that the operative surface should be as large as possible so long as the material can be efficiently collected from it as the output of the apparatus is rendered greater for the same period of operation.

The object of my present invention is to so construct the drum periphery that the side surfaces of the drum adjacent thereto shall be part of one unbroken peripheral surface which can be operated upon by a simple scraper. To this end I form the drum with side surfaces curving into or inclined and then curving into the periphery so that all parts which are exposed to the material to be treated are within the scraping action of a simple curved notch or edge of a scraper, such curve in the scraper being arranged to fit upon the curved drum surface when the scraper is inclined at a suitable angle for collecting the material from the drum and feeding it into any suitable receptacles.

In order that the invention may be thoroughly understood and easily carried into practice I have appended hereunto a sheet of drawings showing my invention.

Figure 1 is a perspective view of the machine with my improvements in use. Fig. 2 is a section through the drum, and Fig. 3 is a detail of a suitable scraper.

On these drawings *a* is a box or receptacle shown merely as an example as any receptacle serving the purpose of providing a mounting for the drum and a receptacle for the material to be treated so that it is brought into contact with the drum as it revolves may be used. In the box here shown an inner lining *b* or removable dish may be used to receive the material.

*c* represents bearings provided to receive the trunnions of the drum *d*, one of the trunnions is provided with a handle *e* and the other is hollow and provided with a closing plug or cap *f* and through this trunnion the freezing materials are introduced into the drum in the known manner. In this illustrated example I have shown the sides of the drum *d* gradually curving with a curved periphery *g*, see Fig. 2. A scraper *h* is provided as before but this is formed at its end, that is toward the drum with a curved notch *i* that will fit the contour of the drum when the scraper is suitably inclined to feed down the frozen material that is removed from the drum. This position is shown at Fig. 1. The scraper may be provided with turned over side flanges *j* or these side flanges may be higher so as to prevent the material passing over the sides of the scraper as it is removed from the drum. I do not limit myself to any particular formation of the sides of the scraper however. The drum *d* may when formed curved in this way be readily produced by two dish like pressings joined by welding, soldering or similar methods along the center of the periphery and the joint smoothed off to leave an unbroken outer contour. Or the drum may be formed by two pressed and drawn parts corresponding to a drum divided in the plane of its axis. The parts in this case require further drawing as will be understood but are easily produced by known pressing and drawing methods.

Having fully described my invention, what I desire to claim and secure by Letters Patent is:—

1. A freezing apparatus comprising a container for the material to be treated, a hollow drum rotatable in said container and adapted to hold the freezing material, said drum having a transversely rounded periphery entirely consisting of a single wide curve continuous with and merging into curved or inclined side walls, and a scraper having a single wide curved notch fitting the said curved periphery.

2. A freezing apparatus comprising a container for the material to be treated, a hollow drum rotatable in said container and adapted to hold the freezing material, said drum having a transversely rounded periphery entirely consisting of a single wide curve continuous with and merging into curved or inclined side walls, and a scraper having a single wide curved notch fitting the said curved periphery, said scraper having its side flanges turned over inwardly, substantially as described.

In testimony whereof I have hereunto set my hand in presence of two subscribing witnesses.

JOHN McAULIFFE LONG.

Witnesses:
ERNALD SIMPSON MOSELEY,
MALCOLM SMETHURST.

Copies of this patent may be obtained for five cents each, by addressing the "Commissioner of Patents, Washington, D. C."